Oct. 2, 1956

L. C. WALLACE 2,765,178

FOLDING SHOPPING CARRIER

Filed Nov. 18, 1954

INVENTOR.
Lauretta Craig Wallace
BY
Nathaniel Frucht
Atty

United States Patent Office 2,765,178
Patented Oct. 2, 1956

2,765,178
FOLDING SHOPPING CARRIER
Lauretta Craig Wallace, Newport, R. I.
Application November 18, 1954, Serial No. 469,710
2 Claims. (Cl. 280—37)

The present invention relates to shopping carts, and has particular reference to a novel construction for a folding shopping carrier.

The principal object of the invention is to provide a shopping carrier of light, compact design and large capacity, which folds into a small, compact, and readily carried article.

Another object of the invention is to provide a shopping carrier having a light foldable metal frame and supporting a foldable bag of textile or other foldable material.

A further object of the invention is to provide a foldable bag for a shopping carrier, having large capacity, the parts thereof being designed to permit very compact folding.

With the above and other objects and advantageous features in view, the invention consists of a novel arrangement of parts more fully disclosed in the detailed description following, in conjunction with the accompanying drawings, and more specifically defined in the claims appended thereto.

Figure 1:
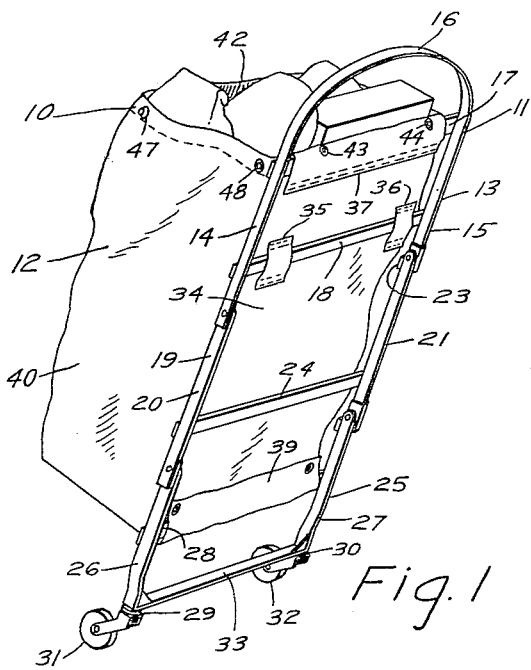
Fig. 1 is a perspective view of an illustrative folding shopping carrier embodying the invention.

It has been found desirable to provide a very light weight shopping carrier of large capacity, which can be folded into compact form for carrying. To this end, I provide a foldable frame, preferably of a light metal such as aluminum, and a bag, preferably of textile material, which is mounted on the frame and has a large carrying volume, and is folded with the frame when the bag is empty. I mount casters or rollers at the lower end of the frame to facilitate rolling movement of the loaded carrier, and I shape the bag to position its center of gravity when loaded over the casters, and to fold compactly when the carrier is folded up.

Referring to the drawings, the carrier 10 includes a light weight foldable frame 11 and a foldable bag 12 of textile material or the like. The frame 11 includes an upper frame member 13 having sides 14, 15 and a rounded top 16 which functions as a carrying handle, the upper member having an upper and a lower cross bar 17, 18 secured to the front thereof, as illustrated. An intermediate frame member 19 has the upper ends of its sides 20, 21 pivotally secured to the lower ends of the sides 14, 15 and nesting therein, the lower ends of the sides 14, 15 being provided with stops 22, 23 at the front thereof, the intermediate member having a cross bar 24 across the lower portion at the front thereof. A lower frame member 25 has two sides 26, 27 pivotally secured to and nesting within the sides 20, 21 an intermediate cross bar 28, and fittings 29, 30 at the lower ends of the sides 26, 27 for mounting pivotal casters 31, 32, the lower ends having a reinforcing cross bar 33.

Figure 4:
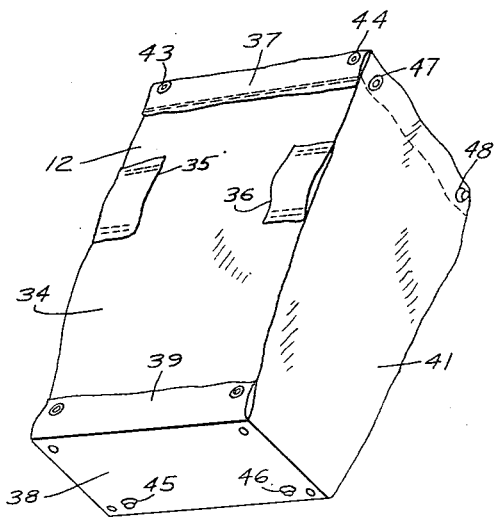
Fig. 4 is a perspective view of the bag in open position.

The bag 12, see Fig. 4, includes a back 34 of generally rectangular shape, having two sewed loops 35, 36 to seat over the lower bar 18 of the upper frame member, and an upper sewed flap 37 to seat over the upper bar 17 of the upper frame member, a bottom 38 of rectangular shape which has a snap flap 39 for seating over the lower frame member cross bar 28, sides 40, 41, and a front 42.

The back 34 has spaced female snap elements 43, 44 at its upper end, preferably on the flap 37 and the bottom 38 has spaced male snap elements 45, 46, adapted to snap engage the elements 43, 44 when the carrier is folded together; the sides 40, 41 each have cooperating spaced snap elements 47, 48 at their upper ends. As clearly shown in Figs. 1 and 4, the sides are cut to be of less width at the lower end, thus providing a slightly converging open bag which brings the center of gravity of the loaded carrier directly above the casters.

Figure 2:
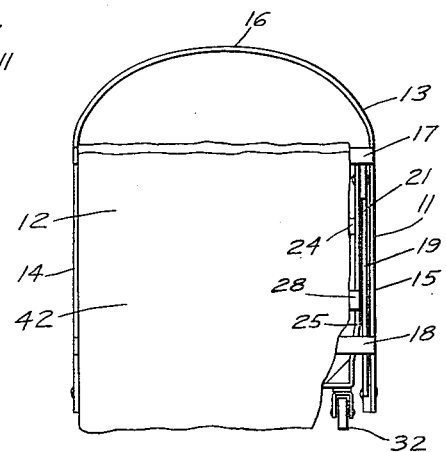
Fig. 2 is a view thereof, the parts being in folded position, one side being broken away to disclose the nesting of the frame parts and the bag.
Figure 3:
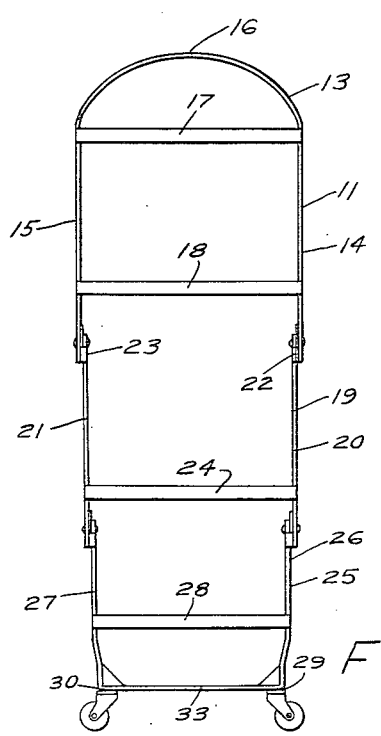
Fig. 3 is a front elevation of the frame, the parts being in unfolded positions.

When folding the carrier, the lower frame element nests in the intermediate frame element and both nest in the upper frame element, see Fig. 2; the bag, with its sides folded inwardly and snapped in folded position, seats against the back, and the bottom and front of the bag fold over and are turned inwardly to snap the bottom fasteners 45, 46 into the upper back fasteners 43, 44, whereby a very compact and neat folded carrier with a carrying handle is provided.

Although I have disclosed a specific constructional embodiment of the invention, it is obvious that change in the size, shape, and material of the parts may be made to meet different shopping carrier requirements, without departing from the spirit or the scope of the invention as defined in the appended claims.

I claim:

1. In combination, a portable carrier comprising a foldable rigid frame, said frame having an upper portion constituting a carrying handle, an intermediate portion pivotally secured to said upper portion for nesting therein, and a lower portion pivotally secured to said intermediate portion for nesting therein, said frame portions each comprising spaced side bars having cross bars extending therebetween, said lower portion having casters mounted thereon, the combination further comprising a foldable bag secured to the upper cross bars and detachably secured to a lower one and extending for substantially the length of said frame, cooperating attachment means on the front and rear portions of the bag for maintaining said bag in a flat, collapsed state and additional cooperating attachment means on the bag bottom and top portions for detachably maintaining the bottom portion of said bag, when the bag is collapsed and folded, against the top portion thereof whereby said collapsed and folded bag may be disposed so as to substantially envelop said frame with the exception of said carrying handle, when the frame is folded and nested.

2. The combination as set forth in claim 1 further characterized in that said foldable bag comprises a back, sides, a front and a bottom, said sides being foldable inwardly and having thereon said first-mentioned attachment means for maintaining the bag in a flat collapsed state, said means comprising snap fasteners, said additional cooperating attachment means also comprising snap fasteners and being carried by said bottom and the upper portion of said back for maintaining the bag in a compact folded position wherein it is adapted to substantially envelop the nested frame.

References Cited in the file of this patent

UNITED STATES PATENTS

| 1,409,838 | Emery | Mar. 14, 1922 |
| 1,554,034 | Richie | Sept. 15, 1925 |
| 1,606,107 | Simms | Nov. 9, 1926 |
| 2,208,347 | Stuart | July 16, 1940 |
| 2,364,246 | Shaver | Dec. 5, 1944 |